G. T. BENSON.
CIGAR-LIGHTERS.

No. 195,082. Patented Sept. 11, 1877.

WITNESSES:
Jas. E. Hutchinson
Henry C. Hazard

INVENTOR:
Geo. T. Benson, by
Prindle and Russell Attys

UNITED STATES PATENT OFFICE.

GEORGE T. BENSON, OF JERSEY CITY, NEW JERSEY.

IMPROVEMENT IN CIGAR-LIGHTERS.

Specification forming part of Letters Patent No. 195,082, dated September 11, 1877; application filed August 20, 1877.

*To all whom it may concern:*

Be it known that I, GEORGE T. BENSON, of Jersey City, in the county of Hudson and in the State of New Jersey, have invented certain new and useful Improvements in Cigar-Lighters; and do hereby declare that the following is a full, clear, and exact description thereof, reference being had to the accompanying drawing, making a part of this specification, in which—

Figure 1:
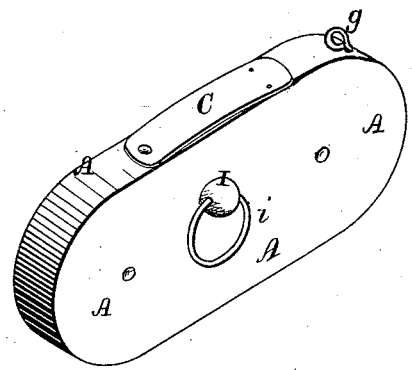
Figure 2:
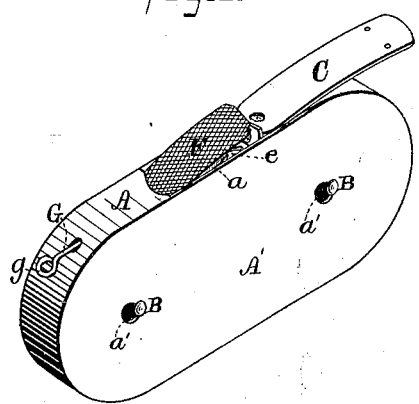
Figure 3:
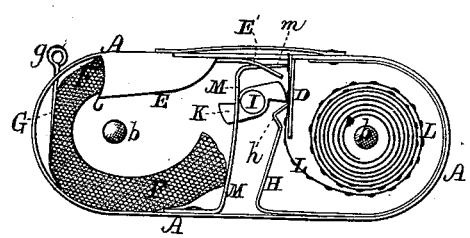
Figure 4:
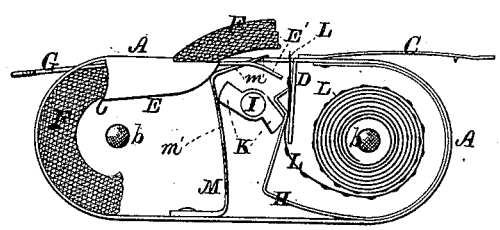

Figure 1 is a perspective view of my improved device as arranged for the pocket. Fig. 2 is a like view of the same arranged for use in lighting a cigar; and Figs. 3 and 4 are, respectively, side elevations of said device as arranged in Figs. 1 and 2, the cover being removed to show the interior construction of parts.

Letters of like name and kind refer to like parts in each of the figures.

My invention is an improvement upon a class of cigar-lighters in which a tinder-fuse is ignited by the explosion, by percussion, of a pellet of fulminating material; and it consists, principally, in the means employed for actuating simultaneously the feeding-pawl and percussion-hammer, substantially as and for the purpose hereinafter specified.

It consists, further, in the peculiar construction of the feeding-pawl and the rotating cam for actuating the same, substantially as and for the purpose hereinafter shown.

It consists, further, in the means employed for retracting the tinder-fuse within, or causing the same to project from, the casing, substantially as and for the purpose hereinafter set forth.

It consists, finally, in the device as a whole, its several parts being constructed and combined to operate in the manner and for the purpose substantially as hereinafter shown and described.

In the annexed drawing, A represents the casing of my device, which has, preferably, a length equal to about twice its breadth, and has its ends rounded, as shown.

The plate A', which incloses one side of the casing A, is secured in place by means of two studs, B, that are attached permanently to the opposite side of the latter, and project through two slots, a', that are provided within said plate. Said studs have heads b that will pass freely through the upper ends of said slots, but extend over said plate when the latter is moved upward, so as to bring the lower narrower portions of said slots beneath said heads.

Within one side of the edge of the casing A is provided an opening, a, that extends between the sides and has a length of about one inch, and is inclosed by means of a correspondingly-shaped plate, C, which is pivoted at one end to or upon the contiguous portion of said casing, so as to be capable of moving edgewise over or away from said opening.

From the lower end of the opening a a plate, D, extends horizontally about one-half the distance toward the opposite or rear edge of the casing A, and fills the space between its sides, while from a point about one-sixteenth of an inch above said plate a second plate, E, extends upward and outward, upward, and then inward and upward in a double curve, as shown, and is securely fastened at its rear edge to or upon the rear side of said casing.

The space between the front edge of the casing A and the front edge of the plate E is inclosed by means of a plate, E', (or by the forward extension of said plate,) and within the same and the upper curved portion of said casing is contained a tinder-fuse, F, which may be caused to project from or be retracted within the same by means of a rod, G, that passes inward through a corresponding opening in the edge near the upper end of said casing.

The inner end of the rod G is spread laterally, so as to prevent its withdrawal from the casing, and said end made sharp, to enable it to engage with the fuse F, while upon the outer end of said rod is provided a ring, g, that prevents it from being pushed into said casing.

It will be seen that the rod G may be pushed horizontally inward, as seen in Figs. 1 and 3, so as to retract the fuse F within the casing, or it may be placed in a vertical position and pushed downward, as shown in Figs. 2 and 4, so as to cause said fuse to project outward from said casing.

Secured to or upon the inner side of the front edge of the casing A, just below the plate D, is a spring, H, which from thence follows the curve of the said edge downward, rearward, and upward to a point somewhat above said plate, and from thence extends downward and forward, with its end resting upon said plate near its longitudinal center. At its outer end said spring is provided with a ⋀-shaped upward projection, $h$, the office of which will be hereinafter explained.

Pivoted or journaled within the rear side of the casing A, at or near its longitudinal center and front edge, is a stud, I, which upon its outer end is provided with a ring, $i$, for rotating the same, and upon its inner end has secured a two-armed bar or cam, K, that has the form shown in Figs. 3 and 4, and has such length as to cause its ends to engage with the projection $h$ of the spring H and move the same forward, when said arms are caused to rotate in a rearward, downward, and forward direction.

After the cam-arm K, which is in engagement with the projection $h$ of the spring-pawl H, has moved the end of the latter nearly to the opening $a$, its upward motion will release it from said pawl, when the latter will spring backward to its normal position.

The spring-pawl H is used for moving outward a fulminating-tape, L, which is loosely coiled around the lower stud B, and from thence passes over the plate D beneath said pawl. When the latter is moved forward by the operation of the cam K, its end engages with and moves forward said tape; but when said pawl is retracted, said tape is held in place by mechanism hereinafter described.

Secured to the inner side of the rear edge of the casing A, at or near its longitudinal center, is a spring, M, that from thence extends horizontally outward nearly to the opposite forward edge of said casing, and has its end $m$, which is made narrow for a short distance, turned downward through a corresponding vertical slot, $e$, that is provided within the lower portion of the plate E, said end $m$ being thus caused to rest upon the plate D, or the fulminating-tape L, at or near the outer end of said plate.

The spring M is placed immediately over the cam K, so that the latter will raise the outer end of said spring at every one-half revolution; but in order that said spring may be released and permitted to fall instantly after reaching its highest point, a slot, $m'$, is provided within the latter, directly over said cam, which slot corresponds to the size and shape, transversely, of each arm of said cam, and, when one of the latter is turned rearward sufficiently, permits said spring to pass downward, as seen in Fig. 3.

The spring thus operated forms a hammer which, striking upon the fulminate that is contained at suitable intervals within the tape L, ignites the same.

If, now, the tinder-fuse F is caused to project downward to or near the projecting end of the tape L, and the spring-hammer M operated as described, the explosion of the fulminate will cause said fuse to be ignited.

It will be seen that the cam K operates simultaneously upon the feeding and igniting devices, (one-half of a revolution being sufficient to move each,) by which means fewer parts are used, and greater simplicity of construction and less expense are secured.

Having thus fully set forth the nature and merits of my invention, what I claim as new is—

1. In a cigar-lighter, a double cam, arranged to actuate simultaneously independent feeding and igniting mechanism, substantially as and for the purpose specified.

2. As a means for feeding forward the fulminating-tape L, the spring feed-pawl H $h$ and the rotary cam K, said pawl being automatically retracted when released by said cam, substantially as and for the purpose shown.

3. As a means for moving outward and retracting the tinder-fuse F, a lever or push-rod, G, pivoted or attached to the casing A, and operating in the manner substantially as set forth.

4. The hereinbefore-described cigar-lighter, in which the casing A, having the opening $a$ and studs B $b$, the cover A', provided with the openings $a'$, the covering-plate C, the anvil-plate D, the fuse housing or tube E E', the fuse-rod G, the feeding-pawl H $h$, the cam K, and the spring-hammer M $m$, are constructed and combined with each other and with the fuse F and fulminating-tape L, in the manner and for the purpose substantially as shown and described.

In testimony that I claim the foregoing I have hereunto set my hand and seal this 18th day of August, 1877.

GEO. T. BENSON. [L. S.]

Witnesses:
N. S. HIBBLER,
JOHN A. McGATH.